US012717911B1

(12) United States Patent
Becraft

(10) Patent No.: US 12,717,911 B1
(45) Date of Patent: Aug. 25, 2026

(54) METHOD FOR SPAM DETECTION VIA INDIVIDUALIZED EMAIL ADDRESSES PER CONTACT

(71) Applicant: Sherman Becraft, Indianapolis, IN (US)

(72) Inventor: Sherman Becraft, Indianapolis, IN (US)

( * ) Notice: Subject to any disclaimer, the term of this patent is extended or adjusted under 35 U.S.C. 154(b) by 0 days.

(21) Appl. No.: 19/383,309

(22) Filed: Nov. 7, 2025

Related U.S. Application Data

(60) Provisional application No. 63/763,233, filed on Feb. 25, 2025.

(51) Int. Cl.
*G06F 21/00* (2013.01)
*G06F 21/55* (2013.01)
*G06F 21/57* (2013.01)

(52) U.S. Cl.
CPC .......... *G06F 21/554* (2013.01); *G06F 21/577* (2013.01); *G06F 2221/034* (2013.01)

(58) Field of Classification Search
CPC . G06F 21/554; G06F 21/577; G06F 2221/034
See application file for complete search history.

(56) References Cited

U.S. PATENT DOCUMENTS

| | | | | |
|---|---|---|---|---|
| 7,549,168 | B1 * | 6/2009 | Magdych | G06F 21/577 726/25 |
| 9,740,858 | B1 | 8/2017 | Wu et al. | |
| 10,652,194 | B2 | 5/2020 | Farkas | |
| 10,805,314 | B2 | 10/2020 | Jakobsson et al. | |
| 11,336,610 | B2 | 5/2022 | Khan | |
| 11,700,234 | B2 | 7/2023 | Dupont et al. | |
| 11,936,604 | B2 | 3/2024 | Jakobsson | |
| 12,074,850 | B2 | 8/2024 | Jakobsson et al. | |
| 2009/0113012 | A1 | 4/2009 | Singer | |
| 2010/0161734 | A1 | 6/2010 | Wang | |
| 2014/0244998 | A1 * | 8/2014 | Amenedo | H04L 63/126 713/156 |
| 2019/0222608 | A1 | 7/2019 | Naccarato et al. | |
| 2021/0152551 | A9 | 5/2021 | Thirumavalavan | |
| 2025/0274409 | A1 * | 8/2025 | Rieffel | H04L 51/02 |
| 2025/0322088 | A1 * | 10/2025 | Khan | G06F 21/577 |

* cited by examiner

*Primary Examiner* — Rodman Alexander Mahmoudi
(74) *Attorney, Agent, or Firm* — Outlier Patent Attorneys, PLLC

(57) ABSTRACT

The disclosed invention pertains to a software system for secure digital communication. It involves generating and assigning a unique email address, structured with a prefix, domain and/or subdomain, to an external user for communication with an internal user. The system monitors subsequent communication, comparing it with the assigned email address to detect any compromise. In case of detected malicious intent, the system initiates appropriate countermeasures, enhancing the overall security of digital communication.

20 Claims, 7 Drawing Sheets

METHOD FOR SPAM DETECTION VIA INDIVIDUALIZED EMAIL ADDRESSES PER CONTACT

BACKGROUND

Field of the Art

"The present disclosure is related to the field of cybersecurity, particularly in generating individualized email addresses for secure and spam-free communication."

Discussion of the State of the Art

In modern digital communication, spam emails pose a serious concern. These unwanted messages can carry malicious codes or programs, capable of damaging an organization's information technology infrastructure or extracting sensitive data. Typically, the threat is amplified due to the evolving nature of spam emails, as malicious actors continuously find ways to obscure their intentions or mimic trusted sources, making the detection incredibly challenging.

Conventional email systems rely on static identifiers. Once an email address is created, it typically remains constant across all communications, vendors, and services. While some modern platforms offer disposable or alias-based address services such as Apple "Hide My Email" or other temporary address generators, these systems require manual configuration and lack integration with enterprise communication workflows. They do not automatically detect when an alias has been misused, sold, or compromised, leaving users vulnerable to continued spam or phishing attacks.

Many email protection systems are reactive rather than preventive. Commercial spam filters and machine learning-based defenses—such as those used in Gmail or Microsoft Defender for Office 365—analyze content only after messages are received. Because they depend on centralized models and historical data, they are unable to anticipate new or emerging threats, allowing novel attack vectors to reach user inboxes before updates are deployed.

Existing spam detection tools also rely on generalized models. Heuristic or Bayesian filters treat all users and messages uniformly, without accounting for the unique relationship or trust level between specific senders and recipients. As a result, these tools often fail to detect sophisticated or context-specific threats that exploit personal or organizational communication patterns.

Current enterprise security gateways and monitoring systems, including Proofpoint and Mimecast, can flag or block suspicious messages but offer little assistance in determining the source of a data breach. When contact lists are leaked or email addresses are sold, these tools cannot identify which external entity was responsible, making targeted remediation and accountability nearly impossible. Feedback-based and reputation-driven spam filters depend heavily on user input to refine detection accuracy. Such approaches are inherently subjective and inconsistent, leading to frequent false positives that block legitimate correspondence and false negatives that permit malicious emails to pass through.

In large-scale enterprise environments, email storage presents a significant computational and operational burden. Corporate email servers routinely process millions of incoming and outgoing messages daily, each message consuming not only disk space but also associated metadata, indexing resources, and backup storage allocations. The cumulative impact of redundant, unsolicited, or compromised emails can severely degrade system performance and increase infrastructure costs. Traditional email retention policies depend on manual curation or broad, rule-based deletion systems that are agnostic to message trustworthiness. As a result, organizations must allocate substantial amounts of storage to preserve both legitimate and unwanted correspondence, including those later identified as spam or associated with compromised contact information. This inefficiency not only increases maintenance overhead but also heightens the risk of storing data linked to security incidents or unauthorized address usage.

In many corporate and enterprise settings, email communications are governed by confidentiality agreements, data-use provisions, or client-vendor contracts that restrict how contact information may be stored, shared, or transferred. Conventional email infrastructures, however, lack mechanisms to enforce or detect violations of these agreements once communication data leaves the originating network. When an external party sells or distributes email contact lists, or when employee credentials are reused by third-party marketers, traditional systems are unable to correlate such actions with the contractual obligations that were breached or discover these breaches after much time has passed. Because conventional spam filters and data-loss-prevention systems evaluate only message content and not the relational context of address usage, potential contract violations—such as unauthorized resale of client information or unapproved data disclosure—may go undetected. This deficiency prevents organizations from identifying which party failed to comply with a contractual restriction and obstructs efforts to assign responsibility or implement corrective action.

SUMMARY

The present invention pertains to a software-enabled method for spam detection and prevention, which works by generating and assigning unique email addresses to external users for communication with internal users. Each email address comprises a domain and subdomain linked to both the sender and recipient. All subsequent communication from the external user to the internal user is scrutinized by comparing it to the assigned email address, which aids in determining whether the address has been compromised. If any malicious intent is detected, the system triggers appropriate countermeasures.

This invention offers an improvement over prior solutions by employing a method that provides individualized contact email addresses for each contact, utilizing a unique prefix, domain, and/or subdomain per user. This approach enables the system to indirectly detect instances of contact list selling, data breaches, and unauthorized use of private information, thereby overcoming the challenges posed by pre-existing solutions.

One of the notable benefits of this invention is its ability to simplify the process of breach analysis. It enables users to determine which external user's data has been stolen or sold, thereby enhancing overall data security and reliability. Therefore, this invention stands as a credible solution to the inherent limitations of existing spam detection and prevention systems.

The disclosed software provides a robust approach towards spam detection and prevention. It generates and assigns an individual email address to each external user for communication with an internal user. The assigned email address is a unique combination of a prefix, domain and subdomain, which is linked to both the sender and recipient.

The software subsequently monitors all further communication from the external user to the internal user. It compares incoming communication to the assigned email address of the external user, enabling it to determine if the address has been compromised.

Upon detection of a potential threat or a deviation from the assigned email address, it can be inferred that there could be a possibility of malicious intent. The software is designed to respond to such threats by deploying suitable countermeasures.

This solution directly improves the functioning of the email communication network itself, not merely the accuracy of spam classification. By performing automated address-level correlation and pattern analysis, the system reduces processing overhead associated with content scanning, eliminates the need for human feedback, and enables traceable identification of data breaches. The technical operation of the system therefore provides a concrete improvement to computer technology: it enhances the integrity and security of networked communication through machine-driven address management rather than subjective or reactive human judgment.

Unlike human-based methods that rely on recognizing suspicious message content, the present invention performs non-cognitive computations that evaluate address integrity, relational data mappings, and temporal communication patterns at a scale and speed not achievable by manual review. The system continuously executes logic across multiple engines within a computing environment, automatically identifying anomalies, applying security policies, and updating relational databases. These processes occur through programmed instructions executed by processors and do not require human observation, evaluation, or decision-making.

Accordingly, the present invention provides a technological improvement to electronic communication infrastructure by transforming how digital addresses are generated, monitored, and remediated. It operates proactively and autonomously to prevent spam and data leakage, achieving a level of precision and responsiveness unattainable through conventional filtering systems or human intervention.

The present invention further enhances the efficiency of corporate email infrastructure by introducing automated storage management tied directly to the integrity of individualized communication addresses. When an incoming email fails to match its assigned address relationship or is determined to originate from an unapproved or anomalous source, the system can discard or quarantine the message without storing it in the primary communication database. By automatically filtering out messages that fail relational verification, the system prevents compromised or irrelevant data from consuming storage resources. Only verified or approved communications are retained for archival or user access, thereby reducing memory load, improving retrieval speed, and maintaining cleaner datasets for future analytics. This selective retention process not only mitigates spam and data exposure risks but also provides a measurable technical improvement in storage utilization and computational efficiency within large enterprise email environments.

The present invention addresses these deficiencies by introducing automated correlation between detected address anomalies and the contractual relationships that govern the corresponding users or entities. The system maintains relational data representing communication agreements between internal and external users, including identifiers for authorized exchange domains and permitted contact scopes. When an unexpected address usage or data-sharing event is detected, the system compares the event to stored contractual mappings to determine whether it represents a potential violation of terms. This automated comparison enables the system to identify the specific agreement affected and to generate a corresponding compliance or alert report. By embedding contractual awareness into the technical operation of the spam-detection and breach-analysis engines, the invention transforms conventional email monitoring into a self-auditing communication framework capable of detecting not only security anomalies but also violations of data-handling agreements in real time.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
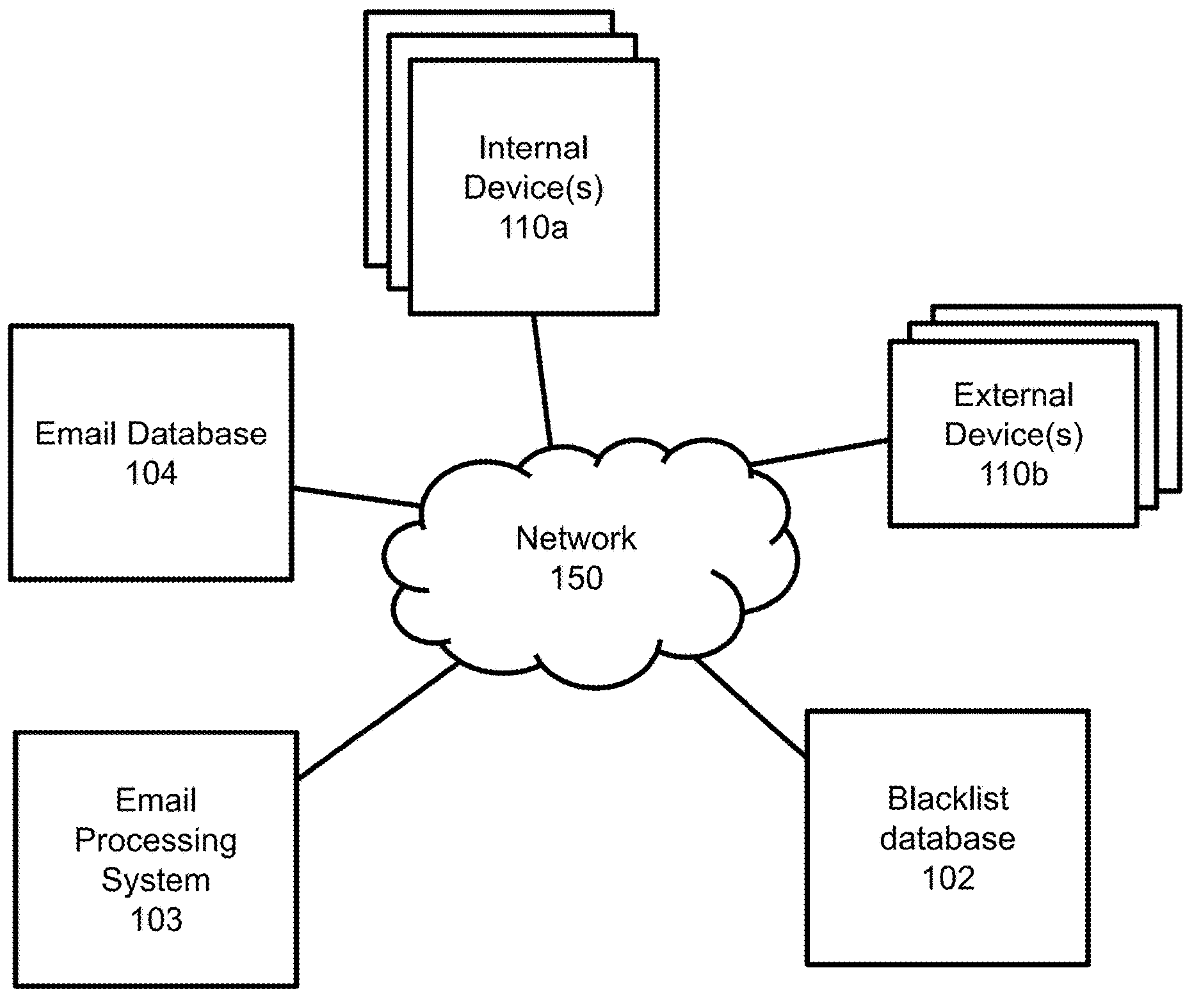
FIG. 1 illustrates a network for email spam detection and remediation in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conceptual Architecture

FIG. 1 illustrates an exemplary embodiment of a spam detection and mitigation system according to one embodiment. The system includes a blacklist database 102, an email processing system 103, Email database 104, and a network 150 over which the various systems communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

The blacklist database 102 may be an external writable database that maintains a record of emails and their associated users, particularly focusing on those that have previously been involved in a data breach or have sold their list of email addresses. The primary function of this database is to serve as a preventive resource against malicious users and a tool to determine the origin of a data breach. The blacklist database 102 may actively compare incoming email addresses with the ones stored in the database. If a match is found, it implies that the incoming email might be from a user involved in past data breaches or email address selling. Such emails can be flagged or blocked, providing a proactive line of defense against potential spam or malicious content. The blacklist database 102 may also be utilized to trace the source of a data breach. By comparing the identified compromised addresses with the ones stored in its database, it can help in identifying the likely origin of a breach, thereby assisting in remedial actions. As for alternatives, The blacklist database 102 may use machine learning algorithms that can be trained to detect spam or malicious emails based on patterns and indicators rather than a pre-existing list. Another alternative could be a system that relies on user-reported spam or phishing emails, which are then added to a blacklist database. Lastly, a cloud-based spam detection system could be used, which compares incoming emails with a continuously updated global database of identified spam emails.

Email processing system 103 may be a processor that plays a central role in enabling the detection of spam emails for internal users and deploying countermeasures against detected threats. Email processing system 103 may function on the basis of the generation and assignment of individualized email addresses to external users for communication with internal users. Each email address is structured using a unique domain and/or subdomain associated with both the sender and recipient. Email processing system 103 may operate by comparing all incoming communication from the external user to the internal user with the assigned email address. This comparison aids in determining whether the address has been compromised. If any malicious intent is detected, the system triggers appropriate countermeasures to neutralize the threat. An alternate approach could involve using a network of processors to carry out these functions. This could enable the simultaneous processing of a larger volume of emails, thereby increasing the efficiency of spam detection. Another alternative could be to incorporate machine learning algorithms in the processor to enhance its spam detection capabilities. This would enable the system to learn from past instances of spam and improve its detection accuracy over time.

Email database 104 may comprise a comprehensive database containing the information of both internal and external users, along with their associated email addresses and relationships to each other. This database plays a crucial role in the functionality of the email processing system. Email database 104 may be designed to evaluate incoming emails by working in conjunction with the database.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Email Processing System

Figure 2:
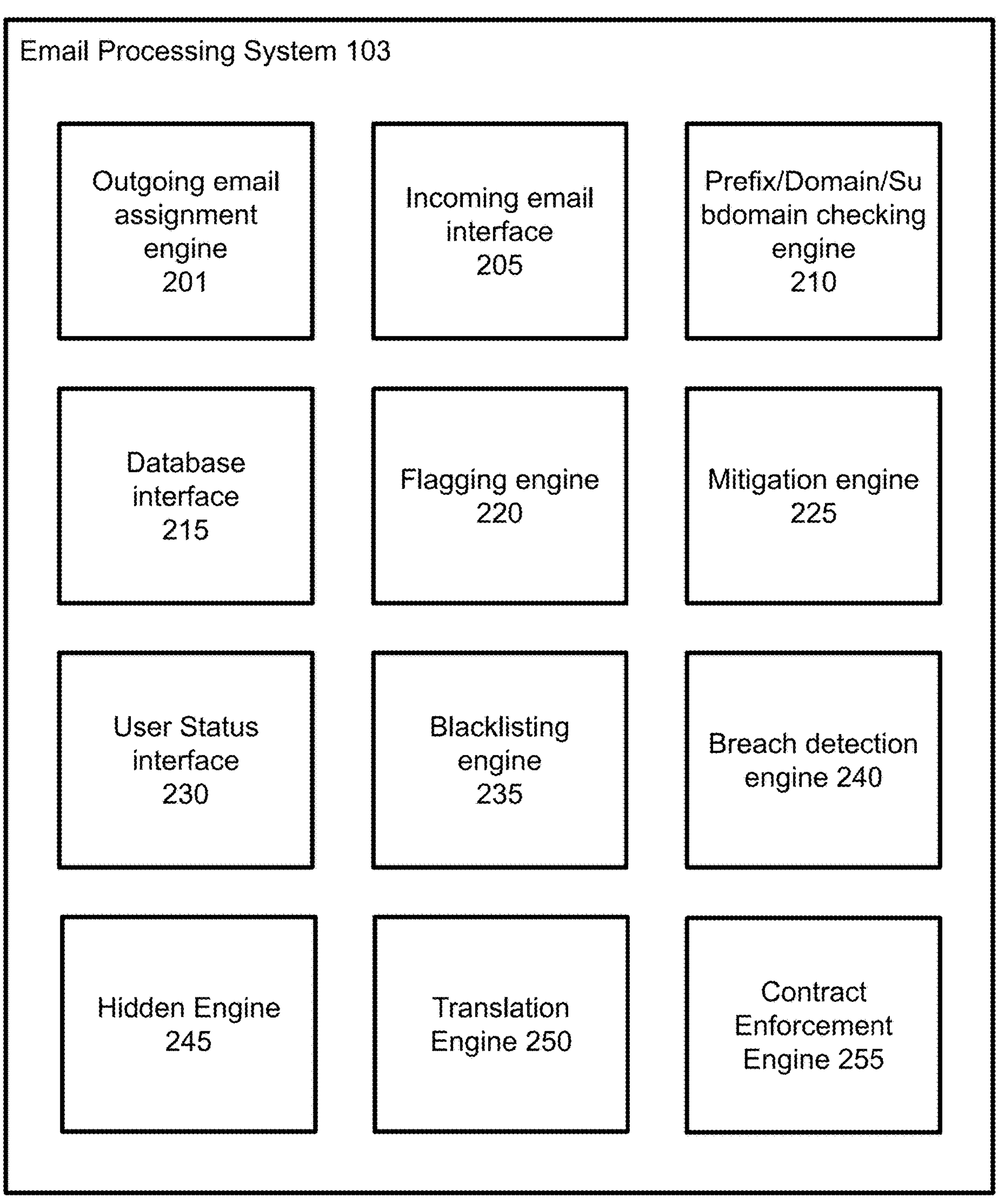
FIG. 2 illustrates a system for email spam detection and remediation in accordance with an exemplary embodiment of the present invention.

FIG. 2 illustrates an exemplary embodiment of the email system 103. The email processing system 103 includes Outgoing email assignment engine 201, Incoming email interface 205, Prefix/Domain/subdomain checking engine 210, Database interface 215, Flagging engine 220, Mitigation engine 225, User status interface 230, Blacklisting engine 235, and Breach detection engine 240. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

Outgoing email assignment engine 201 may be a software module responsible for generating unique email addresses for communication with external users. This address is representative of an internal user and is provided in a one-to-one relationship with each external user. The structure of these email addresses helps identify the recipient and their relationship to the sender. The process by which the engine operates can be broken down into three steps. Firstly, it assigns a prefix, which appears to the left of the @ sign in the email address. This prefix is unique to each internal user within the organization and may be primarily used for checking the presence of spam emails. Secondly, it creates a subdomain, which, in an exemplary embodiment, matches the username of the external user. This subdomain serves to identify the external user and establish their relationship with the internal user. Lastly, the domain is added, typically representing the company website. This three-part structure ensures that each generated email address is unique to its specific internal-external user pair, enhancing the security and manageability of communications. Outgoing email assignment engine 201 may also employ various security checks on the external user. These checks may include CAPTCHA, a test used to determine whether the user is human, and browser fingerprinting, a technique used to collect information about the user's device and browser for identification purposes. These measures provide an additional layer of security, further reducing the risk of spam or malicious activity. While the described embodiment uses a three-part structure for email addresses and employs CAPTCHA and browser fingerprinting for security, alternative implementations could vary. For example, additional or different pieces of information could be included in the email address structure, or other security checks could be used, depending on the specific needs and resources of the organization.

Incoming email interface 205 may be an intermediary interface within the processing system. It is designed to intercept and scrutinize emails that are directed towards internal users. Incoming email interface 205 may serve a dual function of monitoring and analysis. It intercepts incoming emails before they reach the internal user and carries out an in-depth analysis of these messages. The objective of this analysis is to identify any potential security threats or signs of malicious intent contained within the emails. Upon intercepting an email, Incoming email interface 205 first isolates it for analysis. It then compares the email's details, such as the sender's address and content, against predefined security parameters. This comparison allows the system to detect any discrepancies or signs of potential threats.

Prefix/Domain/subdomain checking engine 210 may serve as a security checkpoint for incoming emails. Its main function is to verify the authenticity of the user name, domain, and subdomain of each incoming email against the proper relationship documented in the email database. Prefix/Domain/subdomain checking engine 210 may operate by comparing the prefix, domain, and subdomain of every incoming email with the corresponding information in the email database. If the incoming email's details match the data in the email database, the email is considered authentic and allowed to proceed. However, if there's a mismatch, the email is flagged for further examination, as it could potentially be a spam or malicious email. This process is automated and occurs in real-time, thereby providing a seamless and efficient method of screening incoming emails. The engine is designed to handle a high volume of emails, making it suitable for organizations that receive a large number of emails daily. While the described engine employs a comparison methodology using a user name, domain, and subdomain, alternative methods can be implemented. For example, an alternative engine might use cryptographic methods to verify the authenticity of incoming emails, or machine learning algorithms could be employed to identify patterns associated with spam or malicious emails. These alternatives provide different levels of security and efficiency, making them suitable for different operating environments and security needs.

Database interface 215 may serve as a communication bridge between the processing system and the databases over a network. Its primary function is to ensure the secure and efficient transfer of data relating to user relationships with email addresses and incoming emails. The processing system uses Database interface 215 to interact with the databases. Whenever an email is received, the processing system sends a request through the interface to access data from the databases. The databases contain information about user relationships with email addresses and a list of blacklisted emails. One alternative to this interface could be a local storage system on the processing system itself, where user relationship data and the blacklist are stored. The processing system could then check the incoming emails against this local data without the need for network communication. However, this alternative might not be as efficient or updated as a networked database, and could also present storage limitations. Another alternative could be using a cloud-based system for storing and checking this data, which could offer scalability and remote accessibility advantages.

Flagging engine 220 may provide an additional layer of security in the email communication process by classifying email sources into trusted and untrusted categories. Flagging engine 220 may assign a 'flag' to each email source. This flag denotes whether the source is trusted or untrusted. The flagging of email sources aids in quick identification and evaluation of potentially malicious users. Flagging engine 220 may analyze the communication pattern, history, and other related parameters of an email source. Based on this analysis, it assigns a flag-either trusted or untrusted. Once a flag is assigned, any incoming email from the source is accompanied by this flag. This allows users and the breach detection engine to quickly evaluate the source and determine if further countermeasures are necessary. Flagging engine 220 may apply a rating system. In such a system, each email source is assigned a rating based on its trustworthiness. This rating could then be used in a similar manner to the flags, allowing quick evaluation of potential threats. Additionally, a whitelist and blacklist system could also be implemented, wherein trusted sources are added to a whitelist, and untrusted sources are added to a blacklist. This could provide a clear visual representation of the trustworthiness of email sources.

Mitigation engine 225 may deploy countermeasures against detected malicious emails. Its operation is based on the detection of a security breach and the user's status, taking into account the varied security risks associated with different users. Mitigation engine 225 may respond to detected threats within the email communication system. Once a breach is detected through the analysis of email addresses and communication patterns, the mitigation engine springs into action. Depending on the user's status and the associated security risk, it deploys appropriate responses to combat the malicious email threat. Mitigation engine 225 may operate through a set of predefined rules and procedures. Upon detection of a breach, it first evaluates the user's status and the level of security risk. This evaluation is typically based on the user's role, access privileges, and past security incidents, among other factors. Following the evaluation, the engine deploys a response commensurate with the security risk. The response could range from blocking the email entirely to apply a warning message to the user about the potential threat in the email. There are alternatives to how the Mitigation engine 225 may be configured to respond. For instance, rather than blocking an email or sending a warning, it might route the suspicious email to a separate folder for further investigation. Another alternative could involve notifying a system administrator or a security officer about the detected threat. The actual configuration of the mitigation engine's responses would typically depend on the organization's security policies and the specific requirements of the email communication system.

User status interface 230 may analyze and establish the security levels of various users interacting with the system. User status interface 230 may categorize users based on their security levels. This categorization allows the system to respond appropriately to any potential malicious emails that are directed towards users. There are several potential alternatives to this approach. For instance, one alternative might involve assigning security levels based on the user's role within the organization, with higher-level roles receiving more stringent security measures. Another alternative could involve an adaptive system that dynamically adjusts security levels based on real-time analysis of incoming emails. Regardless of the specific method used, the overall goal remains the same: to categorize users by security level and respond accordingly to any potential threats.

Blacklisting engine 235 may function as a decision-making module within the larger system, performing the critical task of determining whether an email address should be blacklisted and if the associated external user should be added to a ban list. Blacklisting engine 235 may operate by continually monitoring and analyzing the communication patterns between external and internal users. When it identifies a discrepancy or detects malicious activity, it assesses the potential threat level. If the threat level surpasses a predefined threshold, the engine automatically blacklists the email address involved and adds the external user to a ban list. Blacklisting engine 235 may be based on a set of predefined rules and machine learning algorithms. The rules determine the criteria for malicious activity, while the machine learning algorithms help the engine adapt and improve its detection capabilities over time. The algorithms are trained on a dataset of known spam and non-spam emails, learning to identify patterns associated with spam emails. An alternative approach to this engine could employ a rule-based system without machine learning. In this case, the decision to blacklist an email address and ban an external user would be based solely on a set of predefined rules, without the system's ability to learn and adapt over time. Another alternative could involve a system that uses machine learning algorithms exclusively, without any predefined rules. In this scenario, the system would rely entirely on its learning from the training dataset to make decisions.

Breach detection engine 240 may be an analytical tool that aids in identifying potential data breaches or unauthorized sales of email addresses to malicious actors. Breach detection engine 240 may compare and analyze lists of blocked or flagged email addresses. It scrutinizes the associated users and companies to detect any patterns or anomalies that may indicate a data breach or unpermitted sale of email addresses. This process plays a pivotal role in identifying potential threats and mitigating any ensuing damage. Breach detection engine 240 may harness known methods of data breach detection, leveraging a combination of techniques to identify and trace the source of the breach. The system is designed in a way that it can function autonomously, continuously analyzing lists of flagged email addresses for any unusual activity. To enhance the accuracy of its detection capabilities, the engine may also integrate Artificial Intelligence (AI) or other detection algorithms. These advanced technologies allow the engine to intelligently analyze patterns, predict potential threats, and swiftly react to any detected anomalies. It is noteworthy that while AI is a preferred method for data analysis in the engine, alternative technologies can also be used. For instance, Machine Learning algorithms or statistical analysis methods could be employed to detect patterns and anomalies in the data. These alternatives offer flexibility and adaptability, ensuring the engine remains effective in a variety of contexts and continually evolves in line with technological advancements.

Hidden mode engine 245 controls how a recipient sees the sender's assigned external communication address by automatically or manually switching between the full address (e.g., username.subdomain@domain) and a simplified representation (e.g., username@domain, a group alias, or a masked/tokenized handle). The engine evaluates policy inputs—including risk assessment outputs, recipient role or status, group policies, and per-user preferences—and, on send or receive, applies the selected visibility mode by rewriting message headers (e.g., From/Reply-To/Sender), inserting or substituting a display alias, or signaling a client renderer to present the simplified form while preserving the canonical routing address in the SMTP/transport envelope. Hidden mode engine 245 maintains a reversible mapping table between simplified and assigned addresses to support threading, replies, audit, and bounce handling, and exposes override controls to end users and administrators. Alternatives include implementing the engine as (i) a server-side gateway or mail-transfer-agent plugin that performs header/alias rewriting at the edge, (ii) a client-side plugin that renders simplified addresses without modifying transport headers, or (iii) a directory/identity service that issues per-recipient one-time aliases, masks only the subdomain, or tokenizes the username according to policy.

Translation engine 250 automatically reformats outgoing and incoming messages so they interoperate with external calendaring and collaboration systems without additional steps by internal users. The engine detects message intent (e.g., meeting request, update, cancellation) by parsing headers and body content, evaluates content types (e.g. text/calendar, text/html, multipart/mixed), and generates or normalizes standards-compliant artifacts such as iCalendar (.ics) attachments with correct METHOD (REQUEST/REPLY/CANCEL), UID, organizer/attendee fields, time-zone data, and reminders. It rewrites organizer and attendee addresses to the appropriate external communication addresses, adjusts MIME structure to include both human-readable and machine-readable parts, and inserts fallbacks (plain-text summaries and actionable RSVP links) for clients that do not consume calendar MIME directly. The engine may also map proprietary fields (categories, conferencing links, attachments) to portable equivalents, preserve threading and message IDs, and enforce policy (e.g., strip unsupported HTML, sanitize scripts) while maintaining deliverability. Implementation options include a server-side gateway or MTA plug-in that performs MIME/ICS transformation at send/receive time, a middleware microservice invoked via API by the messaging platform, or a client-side add-in that assembles standards-compliant invitations prior to transmission; alternatives further include delegating transformation to a third-party calendaring service or limiting reformatting to specific operations (e.g., only generating .ics attachments or only normalizing time zones) based on policy.

Contract Enforcement Engine 255 may function as a compliance verification module within the email processing system, responsible for correlating detected address anomalies with the contractual obligations established between internal and external users. The engine may maintain or access a repository of contractual mappings that define permissible data exchanges, communication scopes, and approved domains for each relationship. Upon identification of an unexpected or unauthorized communication event—such as a mismatch between an assigned address and an observed sender or recipient—the Contract Enforcement Engine 255 may compare the event data against the stored contractual parameters. If a deviation from permitted communication conditions is detected, the engine may classify the event as a potential contractual noncompliance and trigger a corresponding mitigation or reporting action. These actions may include alerting system administrators, generating compliance audit entries, or initiating message quarantine workflows. In one embodiment, the engine may utilize rule-based logic referencing metadata from the relational database to determine whether specific interactions violate existing agreements. In alternative embodiments, the Contract Enforcement Engine 255 may employ artificial intelligence or machine learning models trained on prior communication and contract data to predict or identify likely contractual deviations. Additional alternatives include implementing the module as a standalone compliance microservice that interfaces with enterprise contract management systems, or as an integrated policy layer within the breach detection engine for unified governance.

Processes for Spam Detection and Mitigation

Figure 3:
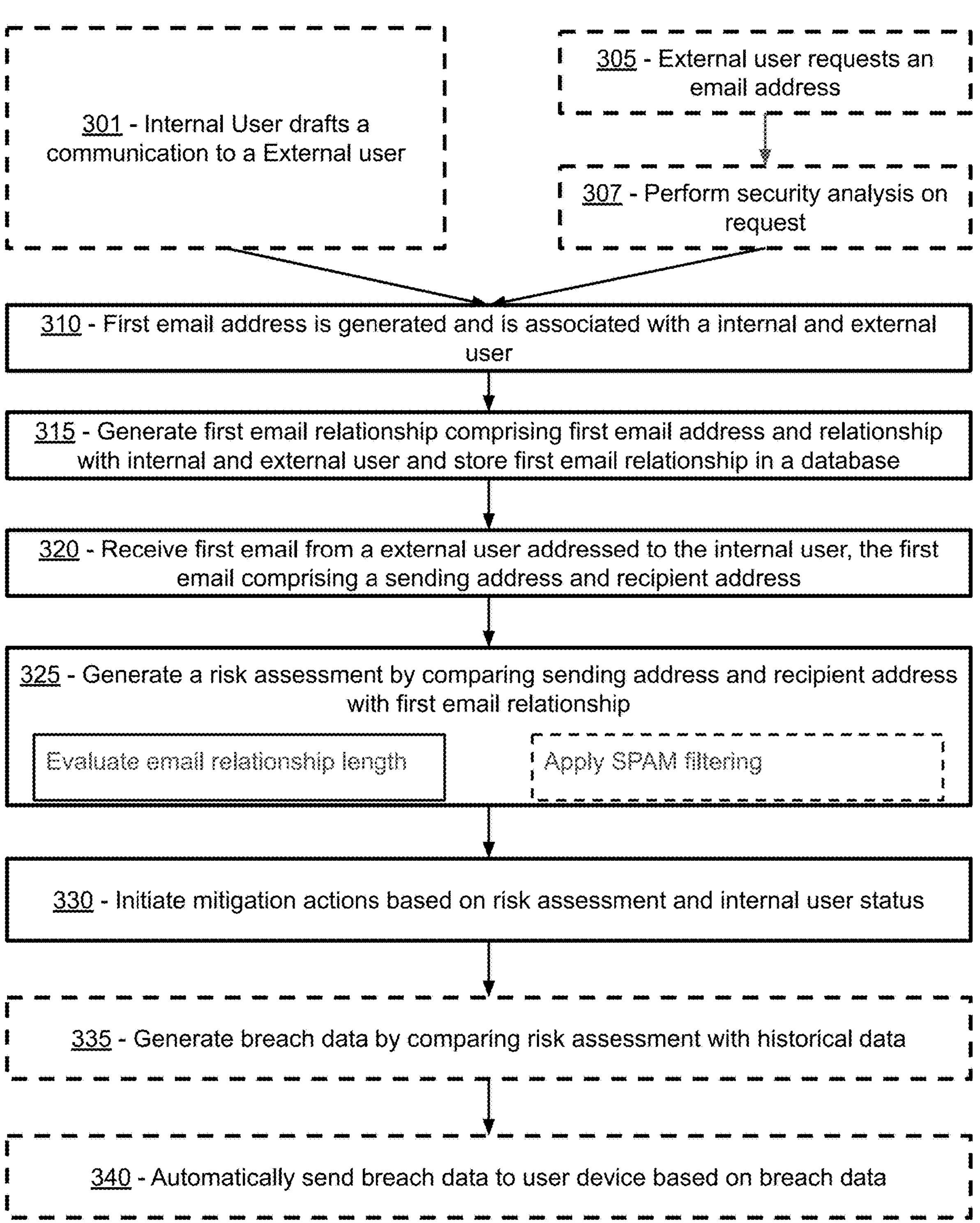
FIG. 3 illustrates an exemplary process for email spam detection and remediation according to one embodiment of the invention.

FIG. 3 illustrates an exemplary process for spam email detection and mitigation according to one embodiment of the invention. The process comprises Internal User drafts a communication to a External user 301, External user requests an email address 305, Perform security analysis on request 307, First email address is generated and is associated with an internal and external user 310, Generate first email relationship comprising first email address and relationship with internal and external user and store first email relationship in a database 315, Receive first email from an external user addressed to the internal user, the first email comprising a sending address and recipient address 320, Generate a risk assessment by comparing sending address and recipient address with first email relationship 325, Initiate mitigation actions based on risk assessment and internal user status 330, Generate breach data by comparing risk assessment with historical data 335, and Automatically send breach data to user device based on breach data 340. The process steps described herein may be performed in association with a system such as that described in FIG. 1 and/or FIG. 2 above or in association with a different system. The process may comprise additional steps, fewer steps, and/or a different order of steps without departing from the scope of the invention as would be apparent to one of ordinary skill in the art.

At Internal User drafts a communication to an External user 301, the software process initiates when an internal user sends an electronic communication, typically an email, to an external email address. The software is designed to automatically generate a unique email address for the external user as soon as this communication is initiated. This unique email address is to be used by the external user for any subsequent communication with the internal user. Step 301 ensures that the generated email address is delivered to the external user. This could be as part of the initial communication from the internal user or via a separate communication. Once the external user has received the unique email address, they can use it for all future communications with the internal user. As an alternative to this process, the system could generate and assign the unique email address at the point when the internal user first decides to communicate with the external user rather than at the point of sending the initial communication. Another alternative could involve the system providing the internal user with a selection of potential unique email addresses for the external user, from which they can choose the most appropriate.

External user requests an email address 305, the software process begins when an external user submits a request for an email address to communicate with an internal user. This request can be made through various interfaces, such as a designated website. As an alternative to this process, the software could also implement a two-factor authentication system for additional security. In this setup, the external user would be required to verify their identity through a secondary method, such as a text message or a phone call, before being allowed to communicate with the internal user.

Perform security analysis on request 307, the software process initiates a security check on the incoming request. This is a proactive measure intended to confirm the authenticity of the user and ensure that the request is legitimate step 307 scrutinizes the request to ascertain that the user is not a known threat. It does this by comparing the user's details or digital footprint against a database of known threats. This database could be updated regularly based on new threats identified, or it could learn dynamically using machine learning algorithms to adapt to evolving threat patterns. Simultaneously, the software process also seeks to confirm that the request is not originating from a bot. It achieves this by deploying anti-bot measures, such as CAPTCHA or other similar tests that are designed to be easily passed by human users but challenging for bots. One alternative that can be employed involves using behavioral analysis. This method analyzes mouse movements, keystrokes, and other user behaviors to differentiate between human users and bots. Another alternative is the use of biometric authentication, which relies on unique physical or behavioral attributes of the user, such as fingerprints or facial recognition, to verify their authenticity. These alternatives can be used separately or in conjunction with the aforementioned process for enhanced security.

First email address is generated and is associated with an internal and external user 310, the system initiates the process of generating an email address. This email address is not a conventional one, but rather, it is structured with a unique combination of a user name, subdomain, and domain. Step 310 the system may correlate these components with both the internal and external users who are set to communicate with each other. The user name, subdomain, and domain are specifically associated with the identities of the communicating parties, thereby customizing the email address for each unique communication scenario. Step 310, the system applies this uniquely generated email address as the conduit for communication between the internal and external users. This means that all messages, data transfers, and other forms of communication between the two parties are channeled through this customized email address. As for alternative methods, the system could alternatively employ dynamic generation of email addresses that not only include the user name, subdomain and domain, but also additional elements such as timestamps or unique identifiers. These could further enhance the uniqueness of the email addresses and provide additional layers of security. Another alternative could be the use of encryption or hashing techniques to generate the unique email addresses, ensuring that even if the email address is intercepted, the actual identities of the communicating parties remain secure.

Generate first email relationship comprising first email address and relationship with internal and external user and store first email relationship in a database 315, the software process begins by establishing a relationship between the users and their assigned email addresses. This relationship is more than just a mere assignment of email addresses, it is a unique identifier that is intrinsically linked to each user and is used as a reference point for further communications. Moving on to step number two, once the relationship is established, the software process saves this information in a database. The database serves as a repository of all user-email address relationships. It is not a static entity, but rather a dynamic one that is constantly updated as new relationships are formed or existing ones are modified. There are alternative methods that can be utilized by the software process. For instance, instead of using a database, the software could use other data storage methods, such as a data warehouse, a data lake, or cloud-based storage. These alternatives might provide certain advantages, such as scalability or cost-effectiveness, depending on the specific needs and circumstances of the users.

Receive first email from an external user addressed to the internal user, the first email comprising a sending address and recipient address 320, the software process initiates with the external user sending an email to an internal user. This can be any communication, whether it's a simple message, a document, or other forms of data shared by an external user. The software process ensures that these emails are handled securely and efficiently. Step 320, the software process may examine the content of the email. It applies various algorithms and filters to scan for potential threats or spam features within the email. This could include suspicious links, attachments, or phrases commonly associated with spam or malicious emails. Step 320, the software process compares the source of the email against the assigned unique email address for that particular external user. This is done to ensure the email is coming from the correct sender and hasn't been compromised or spoofed. In the event the source of the email doesn't match the assigned unique email address, the software process takes appropriate action. This could involve quarantining the email, flagging it for review, or notifying the internal user about the potential threat. As an alternative approach, the software process could also employ machine learning algorithms to continually learn and adapt to evolving email patterns and threats. This could further enhance its ability to detect and prevent spam or malicious emails.

Generate a risk assessment by comparing sending address and recipient address with first email relationship 325, the software process commences with the evaluation of the risk associated with an email. This is achieved by comparing the addresses encapsulated within the initial email to the relationships previously stored in a database. The software meticulously scrutinizes each address within the email, comparing them against known relationships found within the database. The aim is to identify and evaluate any potential risks associated with the email based on known data. Step 325, the process incorporates any existing communication history between the two addresses into the evaluation. The software pulls data from the communication history between the two addresses, if any, and integrates this information into the risk assessment of the email. This process allows for a more comprehensive understanding of the relationship between the two addresses and provides an additional layer of scrutiny in the risk evaluation. In terms of alternatives, step 325 could potentially use machine learning algorithms to enhance the risk evaluation. Instead of relying solely on stored relationships and communication history, machine learning algorithms could analyze patterns and trends in the data to predict the riskiness of an email. Another alternative could be the use of whitelisting or blacklisting techniques, where emails from certain addresses are always accepted or always rejected, respectively.

Initiate mitigation actions based on risk assessment and internal user status 330, the software process commences by analyzing the risk level of an incoming email. This includes scrutinizing the content, sender's details, and any attached files, if present. The software uses advanced algorithms to identify potential threats and ascertain the risk level associated with the email. Step 330, the software process considers the security level of the internal user. It takes into account factors such as the user's role, access rights, and previous history of receiving spam or malicious emails. This step allows the system to tailor its response based on the individual user's security level. Step 330 may then implement mitigation procedures. The nature and extent of these procedures are determined by the previously assessed risk level of the email and the security level of the internal user. These procedures could include isolating the email, blocking the sender, or even notifying the internal user and/or system administrator about the potential threat. Step 330 may flag the suspicious email or add it to a list of potential threats. This list serves as a reference for the system to identify similar threats in the future. Alternative procedures could include the system sending an automated response to the sender, requesting additional verification, or the system could employ machine learning techniques to improve the detection and mitigation procedures over time.

Generate breach data by comparing risk assessment with historical data 335, the software process initiates by accessing and analyzing historical data. The primary focus of this analysis is to understand the patterns and trends of past communication, including both spam and legitimate emails. This high-level overview of the historical data serves as a guide for the system in identifying potential threats and anomalies. Step 335, the software process leverages the insights derived from the historical data to evaluate the potential of a larger data breach. This involves a detailed study of the data patterns and inconsistencies, if any, that can suggest a potential compromise. The software process, at this stage, makes use of sophisticated algorithms to detect discrepancies and signs of malicious activities. In the event the evaluation indicates a high likelihood of a data breach, the system initiates its response mechanisms. These mechanisms may include alerting the relevant stakeholders, blocking the suspicious external user's unique internal email address, or activating other safety protocols. As an alternative approach, the system may also utilize real-time data analysis in conjunction with historical data. This would allow for a more comprehensive evaluation as it combines both past trends and current activities. Another alternative could be the use of machine learning algorithms, which can learn from historical data, improve over time, and become more efficient at detecting potential data breaches.

Automatically send breach data to user devices based on breach data 340, the software process involves the optional transmission of breach information to a user device. This process forms part of a larger system designed for spam detection and prevention, where it functions as a direct communication channel between the system and the user. Upon detection of a potential security breach, like a compromised email address or detected malicious intent, the system generates relevant breach information. This information typically includes details about the nature of the breach, the involved parties, and the time of occurrence. This breach information is optionally sent to a user device. The transmission is facilitated through various methods, such as push notifications, text messages, or emails, depending on the user's preferences and the severity of the breach. The user device could be a smartphone, a tablet, a laptop, or a desktop computer. Step 340 may provide the user with real-time updates about potential security breaches, allowing them to take immediate remedial actions. It adds an extra layer of transparency, helping the user stay informed about the security status of their communication channels. As for alternatives, instead of sending breach information directly to a user device, the system could also store the information in a secure location, such as a cloud-based server or a local database. The user can then access this information at their convenience. Another alternative could be integrating the system with third-party applications or platforms. In this case, the breach information could be sent to a user's email account or displayed on a dashboard within a security management application.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
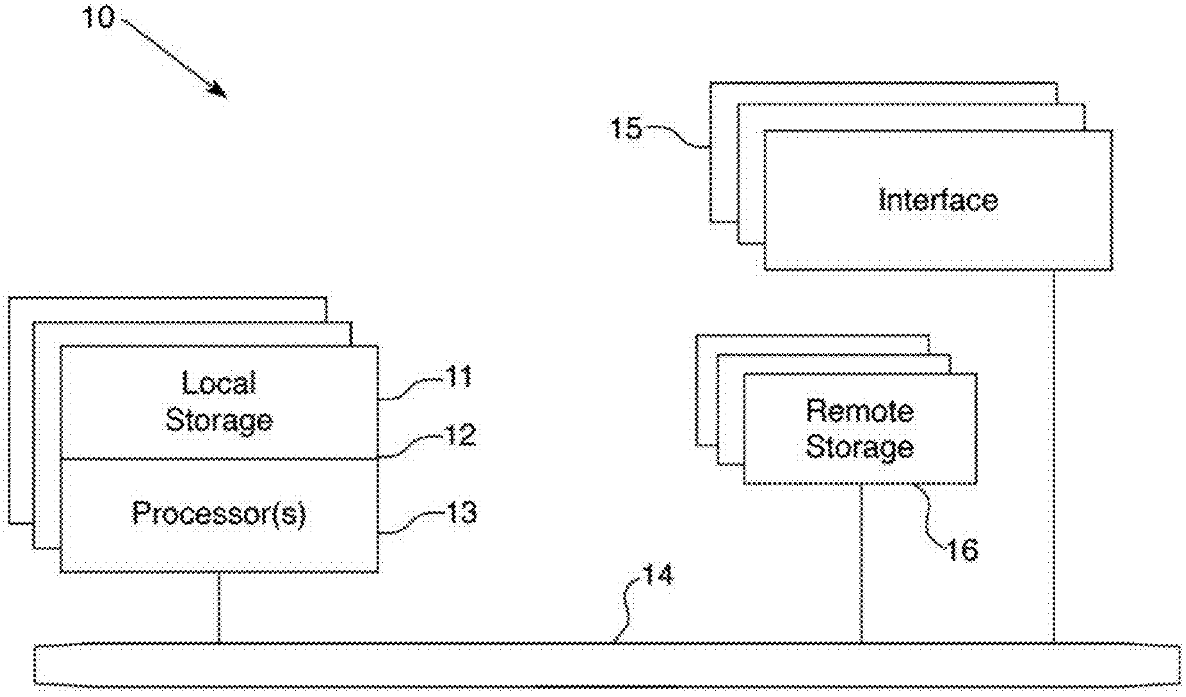
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
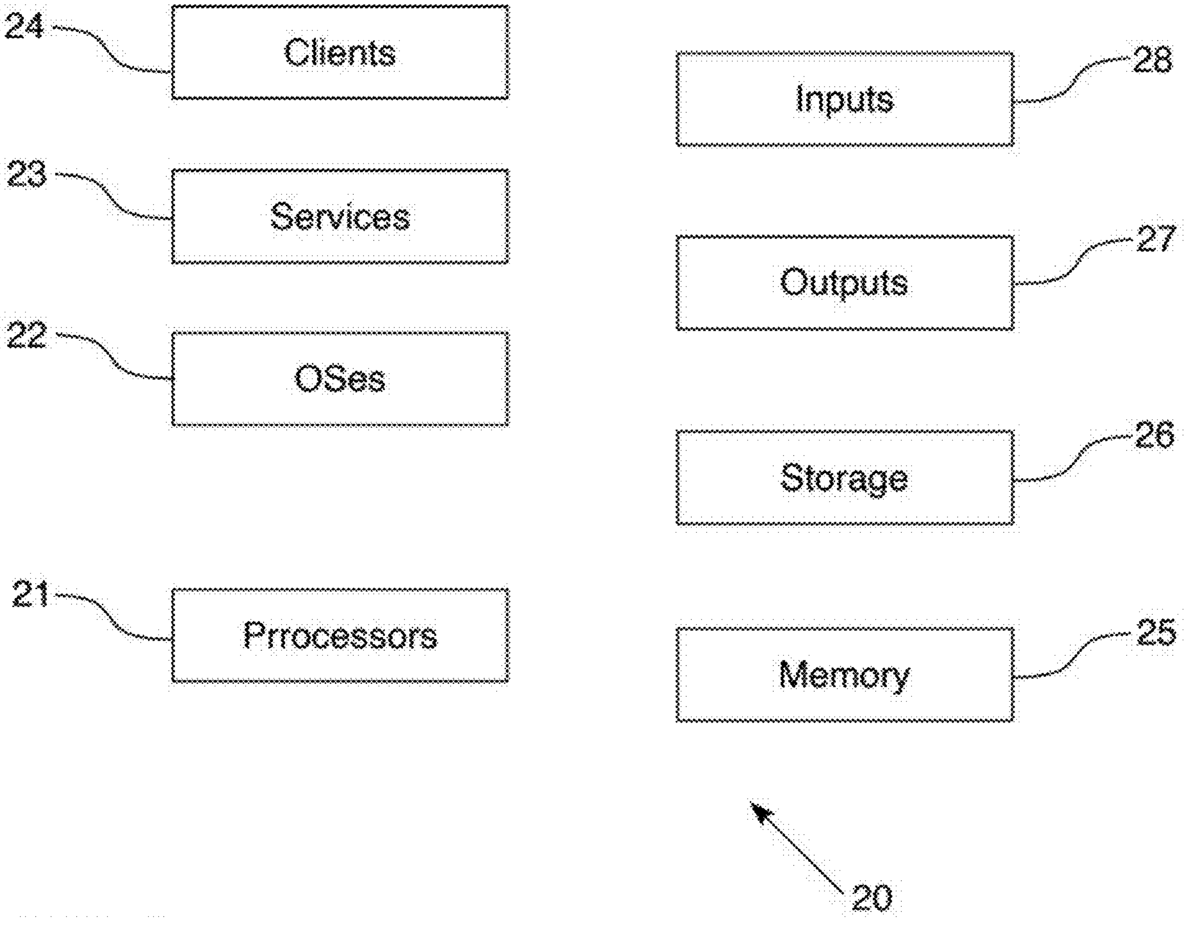
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
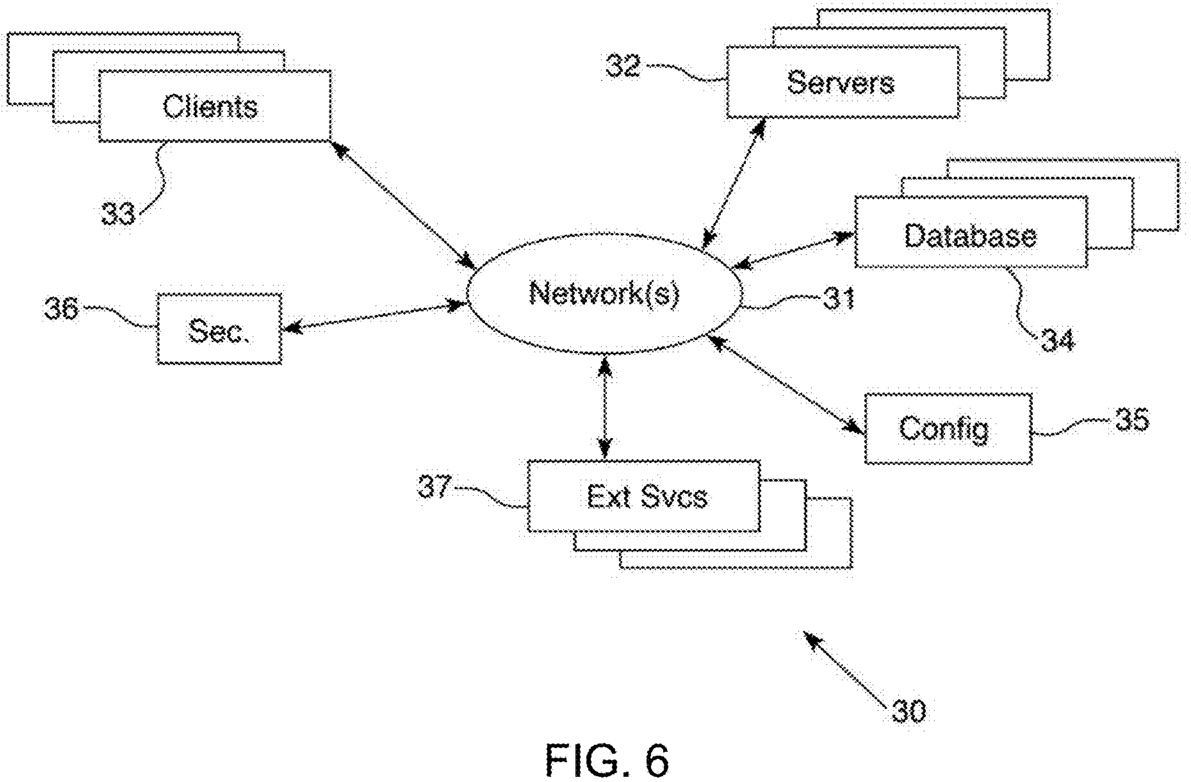
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
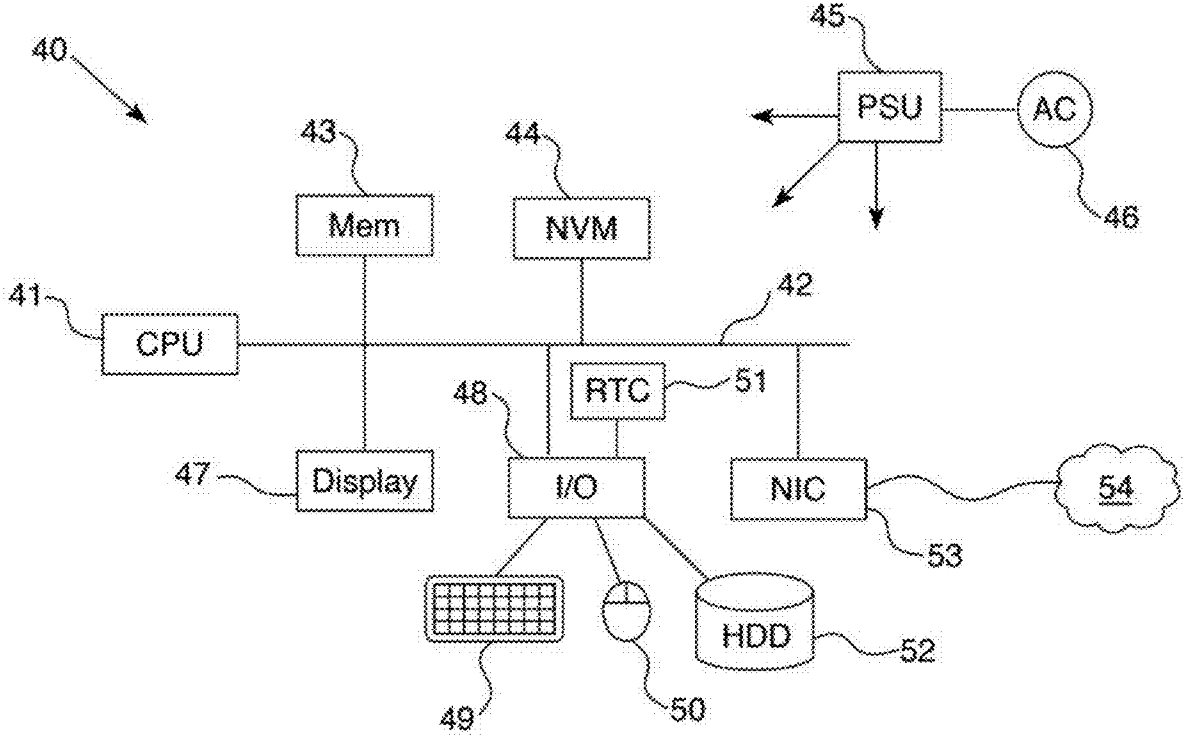
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for spam email detection, the computer implemented method comprising:

at a first time, generating an external communication address associated with a first user account, wherein the external communication address comprises a username, a domain, and subdomain, wherein the username comprises a first identifier associated with the first user account, the subdomain comprises a second identifier associated with a second user account, the domain comprises a third identifier associated with a group associated with the second user account and wherein the first user account is external to the group and wherein the second user account is internal to the group, wherein the second user account has a role in the group;

obtaining first user account identifying information by extracting address data associated with the first user account;

associating the external communication address and first user identifying information and storing the association in a database;

at a second time, after the first time, receiving a communication directed towards the second user account, the communication comprising a message, and a sending address, wherein the sending address comprises a username, a domain and a subdomain;

generating a risk assessment by detecting a mismatch between the first user identifying information, username, domain, and/or subdomain of the communication with the external communication address, wherein the risk assessment comprises a trust level and flagging the first user account that failed the risk assessment; and initiating mitigation actions in near real time based on the risk assessment and the second user account role.

2. The computer implemented method according to claim 1, further comprising receiving a communication request from a first user to communicate electronically with the second user account.

3. The computer implemented method according to claim 2, further comprising performing a security analysis on the communication request.

4. The computer implemented method according to claim 3, wherein the security analysis comprises comparing the first user account's details or digital footprint against a database of known threats, biometric authentication, a human-verification challenge, browser fingerprinting, and/or behavioral analysis of the first user.

5. The computer implemented method according to claim 1, further comprising receiving a request from the second user account to communicate electronically with the first user account.

6. The computer implemented method according to claim 1, wherein the risk assessment further incorporates communication history between the first user account and the second user account.

7. The computer implemented method according to claim 1, further comprising applying SPAM filtering, wherein applying spam filtering comprises executing one or more rules selected responsive to the risk assessment.

8. The computer implemented method according to claim 7, wherein applying SPAM filtering comprises evaluating email relationship length.

9. The computer implemented method according to claim 1, wherein initiating mitigation actions further comprises quarantining the communication in a review mailbox or rerouting the communication to a designated reviewer.

10. The computer implemented method according to claim 1, wherein initiating mitigation actions further comprises revoking the external communication address and generating a replacement external communication address.

11. The computer implemented method according to claim 1, wherein the role of the second user is obtained from a user-status service that categorizes user accounts by security level.

12. The computer implemented method according to claim 1, wherein mitigation comprises blocking, alerting, and/or rerouting the communication.

13. The computer implemented method according to claim 1, further comprising updating a blacklist entry for the address associated with the communication or associated first-user identifier in response to the risk assessment.

14. The computer implemented method according to claim 1, further comprising logging potential unauthorized access within a database as unauthorized access information.

15. The computer implemented method according to claim 14, further comprising generating an unauthorized access status by applying a threshold to the log of potential unauthorized accesses measuring a level of similarity of the potential unauthorized access;

generating an unauthorized access data report, by associating similar potential breaches with each other and the unauthorized access status; and sending the unauthorized access data report to a security user device.

16. The computer implemented method according to claim 14, wherein logging potential unauthorized access information comprises storing at least a timestamp, the address associated with the communication, an identifier of the external communication address, the mismatch type, and the mitigation action taken.

17. The computer implemented method according to claim 1, wherein obtaining first user account identifying information comprises extracting browser information, IP address, and/or screen resolution.

18. The computer implemented method according to claim 1, further comprising comparing, by a contract enforcement engine, a detected address mismatch or a detected unauthorized communication event with contractual data, obtained from a contract database, defining permissible communication relationships, determining whether an event constitutes a potential contractual noncompliance, and initiating a corresponding compliance action in response to the determination.

19. A computing system for processing and managing physical postal mail for inmates of a correctional facility, the computing system comprising:

at least one computing processor; and memory comprising instructions that, when executed by the at least one computing processor, enable the computing system to:

at a first time, generating an external communication address associated with a first user, wherein the external communication address comprises a username, a domain, and subdomain, wherein the username comprises a first identifier associated with the first user, the subdomain comprises a second identifier associated with a second user, the domain comprises a third identifier associated with a group associated with the second user and wherein the first user is external to the group and wherein the second user is internal to the group;

obtaining first user identifying information by extracting data associated with the first user;

associating the external communication address and first user identifying information and storing the association in a database;

at a second time, after the first time, receiving a communication associated with the first user, the communication comprising a message, a username, a domain and a subdomain;

generating a risk assessment by comparing the username, domain, and subdomain of the communication with the external communication address; and initiating mitigation actions based on the risk assessment.

20. A non-transitory computer readable medium comprising instructions that when executed by a processor enable the processor to execute a computer implemented method, the method comprising:

at a first time, generating an external communication address associated with a first user, wherein the external communication address comprises a username, a domain, and subdomain, wherein the username comprises a first identifier associated with the first user, the subdomain comprises a second identifier associated with a second user, the domain comprises a third identifier associated with a group associated with the second user and wherein the first user is external to the group and wherein the second user is internal to the group;

obtaining first user identifying information by extracting data associated with the first user;

associating the external communication address and first user identifying information and storing the association in a database;

at a second time, after the first time, receiving a communication associated with the first user, the communication comprising a message, a username, a domain and a subdomain;

generating a risk assessment by comparing the username, domain, and subdomain of the communication with the external communication address; and initiating mitigation actions based on the risk assessment.

* * * * *